United States Patent
Suau et al.

(10) Patent No.: US 7,462,676 B2
(45) Date of Patent: Dec. 9, 2008

(54) METHOD FOR THE CONTROLLED RADICAL POLYMERISATION OF ACRYLIC ACID AND THE SALTS THEREOF, POLYMERS THUS OBTAINED AND APPLICATIONS THEREOF

(75) Inventors: Jean-Marc Suau, Lucenay (FR); Jean-Bernard Egraz, Ecully (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 10/522,340

(22) PCT Filed: Jul. 24, 2003

(86) PCT No.: PCT/FR03/02337

§ 371 (c)(1),
(2), (4) Date: Aug. 12, 2005

(87) PCT Pub. No.: WO2004/014967

PCT Pub. Date: Feb. 19, 2004

(65) Prior Publication Data

US 2006/0111534 A1      May 25, 2006

(30) Foreign Application Priority Data

Jul. 26, 2002      (FR) .................................. 02 09499

(51) Int. Cl.
*C08F 20/06*      (2006.01)
(52) U.S. Cl. ................. 526/317.1; 526/319; 526/303.1; 526/274; 526/287; 524/425; 524/447; 524/451; 524/431
(58) Field of Classification Search ................. 522/184; 526/222, 317.1, 319, 303.1, 274, 287; 524/556, 524/425, 447, 451, 431
See application file for complete search history.

(56) References Cited

U.S. PATENT DOCUMENTS

| 4,842,651 A | * | 6/1989 | Ravet et al. ................. 106/487 |
| 6,063,884 A | * | 5/2000 | Egraz et al. ................. 526/233 |
| 2006/0111534 A1 | | 5/2006 | Suau et al. |

FOREIGN PATENT DOCUMENTS

| FR | 2 794 463 | | 12/2000 |
| WO | WO 9931144 A1 | * | 6/1999 |

OTHER PUBLICATIONS

John T. Lai. et al., "Functional Polymers from Novel Carboxyl-Terminated Trithiocarbonates as Highly Efficient RAFT Agents", Macromolecules 2002, vol. 35, No. 18, p. 6754-6756.*
U.S. Appl. No. 10/594,519, filed Sep. 28, 2006, Suau et al.
U.S. Appl. No. 10/594,520, filed Sep. 28, 2006, Suau et al.

* cited by examiner

*Primary Examiner*—Randy Gulakowski
*Assistant Examiner*—Michael M Bernshteyn
(74) *Attorney, Agent, or Firm*—Oblon, Spivak, McClelland, Maier & Neustadt, P.C.

(57) ABSTRACT

The present invention concerns a process for controlled radical polymerisation of acrylic acid and its salts in a reactive medium constituted solely of water.

The invention also concerns homopolymers and copolymers of acrylic acid obtained by the polymerisation process.

Finally, the invention concerns the use of the said homopolymers and copolymers of acrylic acid in fields of industry such as the paper field and in particular the coating of paper and the mass-filling of paper, the oil field, or the fields of paint, water treatment, detergency, ceramics, cements or hydraulic binders, public works, inks and varnishes, sizing of textiles or the finishing of leather.

7 Claims, No Drawings

METHOD FOR THE CONTROLLED RADICAL POLYMERISATION OF ACRYLIC ACID AND THE SALTS THEREOF, POLYMERS THUS OBTAINED AND APPLICATIONS THEREOF

The present invention concerns a new process for controlled radical polymerisation of acrylic acid and its salts in a reactive medium consisting solely of water.

The invention also concerns homopolymers of acrylic acid obtained by the new polymerisation process as well as copolymers of acrylic acid with at least one hydrosoluble ethylenically unsaturated monomer, or one of which the copolymer is hydrosoluble.

Finally, the invention concerns the use of the said homopolymers and copolymers of acrylic acid in the fields of industry such as, notably, the paper field and in particular in the coating of paper and the mass-filling of paper, in the oil field, or again in the fields of paint, water treatment, detergency, ceramics, cements or hydraulic binders, public works, inks and varnishes, sizing of textiles or again finishing of leather, and more specifically concerns the application of these polymers as a dispersant and/or grinding aid agent of mineral matter such as natural calcium carbonate, precipitated calcium carbonate, kaolin, titanium dioxide or clays.

Lastly, the invention concerns aqueous suspensions of mineral fillers containing the said polymers and more specifically containing between 0.05% and 5% by dry weight, relative to the total dry weight of the mineral fillers, of the said polymer according to the invention.

Controlled radical polymerisation of ionic monomers is a special means of synthesis requiring the use of specific transfer agents.

Thus, in order to polymerise the sodium methacrylate, the work of Armes (Armes, Chem. Commun, 1999, 1285) implements in a method called Atom Transfer Radical Polymerization (ATRP), 4-cyanopentanoic dithiobenzoate acid, just as Mc Cormick (Macromolecules 2002, 35, 4570-4572 and Macromolecules 2001, 34, 2248) uses it to polymerise, by a method called Reversible Addition Fragmentation Transfer (RAFT), 2-acrylamido 2-methyl propane sodium sulfonate or 3-acrylamido 3-methyl sodium butanoate.

J. Claverie and his team (Macromolecules 2001, 34(16), 5370) as well as the unpublished patent application (FR 01 02848) describe that the choice of substituents for a xanthate or a trithiocarbonate must be made judiciously to obtain RAFT polymerisation. By judiciously made, we mean having high polymerisation yields (higher than 90%) and low polymolecularity indices (lower than 2). We shall note in this regard that the polymolecularity index and the molecular masses are, in the publication of Claverie and his team, measured by a chromatographic method called Gel Permeation Chromatography (GPC) in an aqueous medium with polyacrylates as standards, which enables the value of the molecular masses and the polymolecularity indices to be estimated very accurately.

However, the molecules of interest, i.e. the transfer agents, are not soluble in water and it is necessary to use a protic solvent to undertake the syntheses.

Other documents (WO 99/31144; WO 00/75207; WO 01/27176; WO01/42312; WO 02/08307; WO 02/22688) require the use of a reactive medium for synthesis of the transfer agent other than water. These transfer agents synthesised in a solvent medium other than water do not allow acrylic acid to be polymerised in the same reactive medium as that which allowed synthesis of the transfer agent. Furthermore, the work of Destarac (Macromol.Rapid.Commun. 2001, 22 (18), 1497-1503 or again WO 98/58974) concerns notably the polymerisation of acrylic acid using xanthates with the following structures:

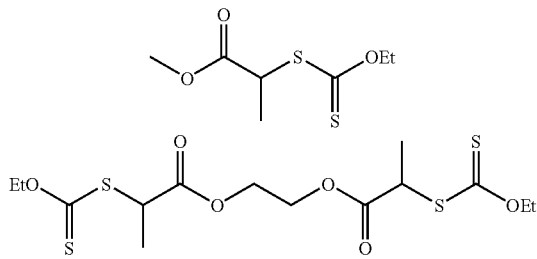

one of the limitations of which is that they also require a reaction co-solvent which is essential for solvation of these said xanthates to obtain a uniform medium.

The few transfer agents capable of controlling polymerisation of acrylic acid must be solvated in another solvent, which may engender subsequent complex purifications such as distillations. In addition, a co-solvent may generate secondary transfer reactions which then come into competition with the transfer reaction of the RAFT type.

By "transfer agents" the Applicant designates throughout the present application, including the claims, compounds capable of stopping the growth of polymer chains but in a non-irreversible manner.

Thus, the skilled man in the art encounters the problem which consists at once in having a hydrosoluble transfer agent which is genuinely effective with acrylic acid, and in finding a transfer agent the synthesis of which does not require on the one hand the use of often harmful solvents and on the other hand of purification stages such as extractions or distillations (WO 00/75207-WO 01/42312).

The outcome of this is a difficulty of accomplishment since the transfer agent must be synthesised in several operations, since the polymer is obtained in a new reactive medium, and since it must be purified again of all traces of solvent in order to be able to be used in the abovementioned aqueous industrial applications.

Another related problem also lies in the obligation to seek, for industrial applications, transfer agent molecules which are relatively simple and easy to use, with a cost acceptable in industry.

Thus, until now there has been no process for homopolymerisation or copolymerisation of acrylic acid using a transfer agent capable of enabling controlled radical homopolymerisation or copolymerisation of acrylic acid in a reactive medium consisting solely of water, and excluding all other solvents, and not posing the abovementioned problems.

There is thus, despite the progress recorded by the "RAFT" technology, a major and acknowledged need for a process for homopolymerisation or copolymerisation of acrylic acid in a reactive medium consisting solely of water and using a transfer agent the synthesis of which does not require on the one hand the use of often harmful solvents and on the other hand purification stages such as extractions or distillations.

The Applicant then found, surprisingly, that a batch or semi-batch process of homopolymerisation of acrylic acid, or of copolymerisation of acrylic acid with at least one hydrosoluble ethylenically unsaturated monomer or one of which the copolymer is hydrosoluble, in a reactive medium consisting solely of water, a process which comprises two stages, the first of which consists of "in situ" synthesis of a hydrosoluble transfer agent, used in the second stage of polymerisation, enables the abovementioned problems to be resolved.

By batch process, the Applicant means a process for polymerisation in solution in which all the monomers are introduced in the initial stage. This process thus enables polymers different from block polymers to be obtained.

By semi-batch process, the Applicant means a process for polymerisation in solution in which all the monomers are introduced throughout the polymerisation. This process also enables polymers different from block polymers to be obtained.

Another variant of the batch or semi-batch process consists in a process of polymerisation in solution in which a part of the monomers is present in the reactor in the initial stage, the other part being introduced throughout the polymerisation. This other variant of the process also enables polymers different from the block polymers to be obtained.

One aim of the present invention is thus a new batch or semi-batch process for controlled radical polymerisation of acrylic acid, enabling a hydrosoluble transfer agent to be obtained which is genuinely effective with acrylic acid, and enabling a transfer agent to be obtained the synthesis of which does not require on the one hand the use of often harmful solvents, and on the other hand a purification stage such as extractions or distillations.

The process in according to the invention, for controlled radical homopolymerisation, in an aqueous solution, of acrylic acid, or/for controlled radical copolymerisation, in an aqueous solution, of acrylic acid, with at least one hydrosoluble ethylenically unsaturated monomer, or one of which the copolymer is hydrosoluble, is characterised in that it is in batch or semi-batch mode, and in that it has two stages the first of which is "in situ" synthesis of the hydrosoluble transfer agent.

This "in situ" synthesis of the catalyser means that it does not to have to be handled as such, even if it can be advantageous to remove the residue from the synthesis of the transfer agent which is potassium or sodium bromide. This operation is not in any sense indispensable.

When the process according to the invention consists of a controlled radical copolymerisation, in batch or semi-batch mode, of acrylic acid with at least one hydrosoluble ethylenically unsaturated monomer, or one of which the copolymer is hydrosoluble, the hydrosoluble ethylenically unsaturated monomer or monomers, or ones of which the copolymer is hydrosoluble, are chosen from among methacrylic acid, itaconic acid, maleic, 2-acrylamido-2-methyl-1-propane sulphonic acid in acid form or partially neutralised, 2-methacrylamido-2-methyl-1-propane sulphonic acid in acid form or partially neutralised, 3-methacrylamido-2-hydroxy-1-propane sulphonic acid in acid form or partially neutralised, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid and all their salts, vinyl sulphonic acid, sodium methallylsulfonate acid, sulfopropyl acrylate or methacrylate, sulfomethylacrylamide, sulfomethylmethacrylamide, or from among acrylamide, methylacrylamide, n-methylolacrylamide, n-acryloylmorpholine, ethylene glycol methacrylate, ethylene glycol acrylate, propylene glycol methacrylate, propylene glycol acrylate, propene phosphonic acid, acrylate or methacrylate phosphate of ethylene or propylene glycol, or from among vinylpyrrolidone, methacrylamido propyl trimethyl ammonium chloride or sulphate, methacrylate of trimethyl ammonium ethyl chloride or sulphate, as well as their acrylate or acrylamide counterparts, whether quaternised or not, and/or ammonium dimethyldiallylchloride, as well as mixtures of them.

More particularly, the process according to the invention is characterised in that the hydrosoluble transfer agent is an α-substitute β-carboxylate xanthate salt.

In an even more particular manner, the hydrosoluble transfer agent according to the invention is an α-substitute β-carboxylate sodium xanthate, and completely preferably the α-substitute β-carboxylate sodium xanthate according to the invention is an α-methyl β-carboxylate sodium xanthate.

In an equally particular manner, the process according to the invention is characterised in that the reactive medium of the first stage of synthesis of the transfer agent and of the second stage of polymerisation is identical and is water.

According to a preferred production method, in the second stage of polymerisation the limits of quantity of transfer agent are determined such that the molar ratio of transfer agent to monomer is between 0.001% and 20%, and the mass ratio of transfer agent to monomer is between 0.01% and 60%.

In a particularly specific manner, the process according to the invention thus consists in bringing into contact in the first stage:
 a potassium xanthate,
 2-bromopropionic acid sodium salt,
 water, and then in adding in a second stage acrylic acid and at least one hydrosoluble initiator of free radicals.

The free radical initiators used in the process of polymerisation according to the invention are the initiators of hydrosoluble free radicals which are very familiar to the skilled man in the art and are, notably, chosen from among the hydroxylamine based compounds or from the bisulphites such as sodium metabisulphite or from the peroxides such as, among others, hydrogen peroxide or tertio-butyl hydroperoxide, or from among the persalts such as, notably, sodium, ammonium or potassium persulphate or perborate or perchlorate or similar, or are chosen from among the azo compounds such as notably 4-4'-azobis (4-cyanopentanoic) acid, 2-2'-azobis (2-methyl-N-hydroxyethyl)-propionamide, 2-2'-azobis (2-methyl-N-(1,1-bis(hydroxymethyl)ethyl)propionamide, 2-2'-azobis(N,N'-dimethyleneisobutyramidine) dichloride, 2-2'-azobis(2-amidinopropane) dichloride, 2-2'-azobis(N,N'-dimethyleneisobutyramide) dichloride, 2-2'-azobis(isobutyramide) dihydrate, or are chosen from among sodium hypophosphite, hypophosphorous acid, or phosphorous acid and/or their salts, possibly in the presence of metal salts, for example of iron or copper, or are chosen from mixtures of at least two of the abovementioned initiators.

In an even more specific manner, the first stage is accomplished with equimolar quantities of potassium xanthate and the sodium salt of 2-bromopropionic acid, while the second stage takes place with the abovementioned limits in terms of quantity of monomer transfer agent.

The invention also concerns the transfer agents used in the above process.

These hydrosoluble transfer agents according to the invention are characterised in that they are obtained in the polymerisation reactive medium, namely water.

In a very particular manner, the hydrosoluble transfer agent according to the invention is characterised in that it is sodium α-methyl β-carboxylate xanthate.

Another aim of the invention is to provide the polymers obtained by the above process.

The polymers according to the invention are obtained in a very simple manner and require no or very little purification.

The polymers according to the invention are characterised in that they are obtained by the process of polymerisation according to the invention and in that they have an average molecular mass by weight ($M_w$) of between 1000 g/mole and 60,000 g/mole, and more particularly between 4500 g/mole and 8000 g/mole, with a polymolecularity index of less than or equal to 2 for a conversion rate relative to acrylic acid higher than 90%.

The conversion rate of acrylic acid into poly(acrylic acid) is measured by high-pressure liquid chromatography (HPLC). In this method, the components constituting the mixture are separated on a stationary phase and detected by a UV detector. After calibration of the detector, it is possible, starting from the area of the peak corresponding to the acrylic compound, to obtain the quantity of residual acrylic acid. This methods forms part of the state of the art, and is described in many reference works such as, for example, in the manual "Experimental Organic Chemistry", by M. Chavanne, A. Julien, G. J. Beaudoin, E. Flamand, second Edition, Editions Modulo, chapter 18, pages 271-325.

The average molecular mass by weight is determined by a GPC method the standard for which is a serie of 5 sodium polyacrylate standards supplied by Polymer Standard Service as references PAA 18K, PAA 8K, PAA 5K, PAA 4K and PAA 3K.

The Applicant stipulates in this respect that polyacrylate calibration is chosen since it feels that it is the most appropriate one for acrylic acid polymers, and since the results obtained depend on the type of calibration used.

These homopolymers and/or copolymers according to the invention are either in their acid form, i.e. non-neutralised, or partially or totally neutralised by one or more monovalent, divalent, trivalent neutralisation agents, or neutralisation agents with higher valencies, or mixtures thereof.

Monovalent neutralisation agents are chosen from the group constituted by the compounds containing alkaline cations, particularly sodium and potassium, or again lithium, ammonium, or again the aliphatic and/or cyclic primary or secondary amines such as, for example, the ethanolamines, mono- and diethylamine or cyclohexylamine.

Divalent or trivalent neutralisation agents, or neutralisation agents with higher valency, are chosen from the group constituted by the compounds containing divalent cations belonging to the alkaline earths, particularly magnesium and calcium, or again zinc, and also by the trivalent cations, particularly aluminium, or again by certain compounds containing cations with a higher valency.

Finally, another aim of the invention is the use of these polymers according to the invention in the fields of industry such as, notably, the paper field and in particular in the coating of paper and the mass-filling of paper, in the oil field, or again in the fields of paint, water treatment, detergency, ceramics, cements or hydraulic binders, public works, inks and varnishes, sizing of textiles or again finishing of leather, and more specifically concerns the application of these polymers as a dispersant and/or grinding aid-agent of mineral material such as natural calcium carbonate, precipitated calcium carbonate, kaolin, titanium dioxide or clays.

Thus, the invention also concerns aqueous suspensions of mineral fillers containing the said polymers and more specifically containing between 0.05% and 5% by dry weight of the said polymer relative to the total dry weight of the mineral fillers.

These aqueous suspensions of mineral fillers are also characterised in that the mineral filler is chosen from among natural calcium carbonate such as, notably, calcite, chalk or marble, synthetic calcium carbonate also called precipitated calcium carbonate, dolomites, magnesium hydroxide, kaolin, talc, gypsum, titanium oxide, or aluminium hydroxide, or any other mineral filler habitually used in fields such as, notably, the paper field, in particular in the coating of paper and the mass-filling of paper, oil, paint, water treatment, detergency, ceramics, cements or hydraulic binders, public works, inks and varnishes, sizing of textiles or finishing of leather.

Papers manufactured and/or coated according to the invention are characterised in that they contain the said aqueous suspensions of mineral fillers according to the invention.

Paint formulations according to the invention are characterised in that they contain the said aqueous suspensions of mineral fillers according to the invention.

Drilling muds according to the invention are characterised in that they contain the said aqueous suspensions of mineral fillers according to the invention.

In practice the disintegration operation, also called the dispersal operation, of the mineral substance to be dispersed can be accomplished in two different manners. One of the manners consists in preparing by stirring a suspension of mineral fillers by introducing all or part of the dispersant agent according to the invention in the aqueous phase, followed by the mineral material, so as to obtain the aqueous suspension of mineral fillers used in the abovementioned fields of application.

Another manner consists in preparing the suspension of mineral fillers by introducing into the mineral filler cake the full quantity of dispersant agent to be tested so as to obtain the aqueous suspension of mineral fillers used in the abovementioned fields of application. This disintegration operation may follow the grinding operation described below or may be implemented in a completely independent manner.

Thus, in practice, the operation to grind the mineral substance to be refined consists in grinding the mineral substance with a grinding body into very fine particles in an aqueous medium containing the grinding aid agent.

The grinding body, of granulometry preferably between 0.20 and 4 millimeters, is added to the aqueous suspension of the mineral substance for grinding. The grinding body generally has the form of particles of materials as diverse as silicon dioxide, aluminium oxide, zirconium oxide or mixtures thereof, as well as synthetic resins of great hardness, steels or other. An example of the composition of such grinding bodies is given by patent FR 2303681 which describes the grinding elements formed 30% to 70% by weight of zirconium oxide, 0.1% to 5% of aluminium oxide, and 5% to 20% of silicon dioxide.

The grinding body is preferably added to the suspension in a quantity such that the ratio by weight between this grinding material and the mineral substance for grinding is at least 2/1, this ratio being preferably between the limits 3/1 and 5/1. The mixture of the suspension and of the grinding body is then subjected to the mechanical stirring action, as this occurs in a traditional grinder with micro-elements.

The time required to arrive at the desired refinement of the mineral substance after grinding varies according to the nature and quantity of the mineral substances to be ground, and according to the stirring method used and the temperature of the medium during the grinding operation.

The aqueous suspensions thus obtained can be used in the field of mass filling or coating of paper.

During manufacture of the paper sheet, i.e. during their use as a mass load, these suspensions can be used with the coating brokes.

They can also be used in the field of paints or drilling muds.

Papers manufactured and/or coated according to the invention are characterised in that they contain aqueous suspensions of mineral fillers according to the invention.

Paint formulations according to the invention are characterised in that they contain the said aqueous suspensions of mineral fillers according to the invention.

Other characteristics and advantages of the invention will be better understood on reading the non-limitative examples which follow.

EXAMPLE 1

This example concerns the preparation of different polymers according to the invention.

To do so, according to the following reaction:

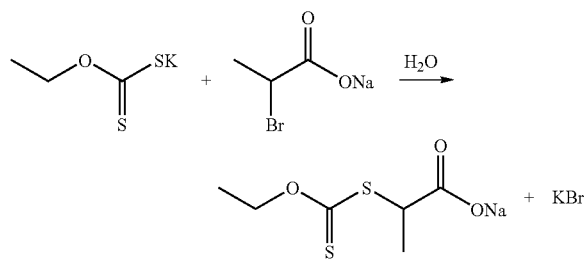

synthesis of hydrosoluble xanthate is stoichiometric and is accomplished completely in water.

Test n° 1:

For this test, the following is introduced into a 1 liter reactor fitted with a stirring mechanism:
- 5.14 g of potassium xanthate,
- 4.91 g of 2-bromopropionic acid dissolved in 10 g of water,
- 2.57 g of 50% soda, diluted in 10 g of water;

and a solution with a pH of approximately 5.6 is obtained, to which 5 g more water is added.

A clear, slightly orangey solution is then obtained, which is stirred for two hours at ambient temperature (approximately 25° C.).

The substitution of bromide by xanthate is then checked by dosing the free bromide Br⁻ by capillary electrophoresis.

The following are then loaded into this reactor:
- 202.8 g of bipermuted water,
- 67.6 g of acrylic acid,
- 0.54 g of hydrosoluble initiator of the acid type, 4,4' azobis (4-cyanopentanoic) sold by the company Vopak under the name V501.

The medium is then reflux heated (to a temperature of approximately 101° C.) for seven hours.

A yellow uniform medium is then obtained which is neutralised with 50% soda until a pH of 8.2 is obtained.

The concentration of dry matter, measured by dissecation, is 25.7%.

The concentration in unreacted acrylic acid is 430 ppm measured by HPLC as stated above; which gives a conversion rate relative to acrylic acid of 99.2%.

A GPC measurement of the solution gives, for a calibration undertaken with polyacrylic acid standards (sodium polyacrylates sold by the company Polymer Standard Service under the names PSS-PAA of 18K to 2K), a molecular mass by weight of 4960 g/mole for a polymolecularity index of 1.97.

Test n° 2:

The operational conditions, the equipment and the compounds used in this test are identical in all points to the previous test, except for the neutralisation of the polymer obtained after 7 hours' heating, which is undertaken up to a pH of 8.2 using a soda-lime mixture in a 50/50 molar ratio.

The characteristics of the polymer obtained in terms of molecular weight, unreacted acrylic acid and polymolecularity index are identical to those of the previous test.

This example enables it to be shown that it is possible to synthesise in an aqueous medium a totally hydrosoluble xanthate salt, and that this totally hydrosoluble xanthate salt is capable of polymerising acrylic acid with high yields with a control of the reaction enabling the low polymolecularity indices to be obtained; by low we mean values which are less than or equal to 2.

Test n° 3

This test also concerns the preparation of a polymer according to the invention implementing in a first stage the synthesis "in situ" of the hydrosoluble transfer agent, followed by the stage of polymerisation of acrylic acid.

To do so, the following is introduced into a 500 ml reactor fitted with a stirring mechanism:
- 30 g of water;
- 5 g of alpha bromo phenyl acetic acid;
- the medium is then neutralised with 3.85 g of 50% soda;
- 3,727 g of potassium xanthate ethyl is then added.

The medium is clear and the measured pH is equal to 4.

This is left under stirring for two hours at ambient temperature.

The following are then loaded into this reactor:
- 214 g of water;
- 71.4 g of acrylic acid;
- 0.57 g of hydrosoluble initiator of the acid type, 4,4' azobis (4-cyanopentanoic) sold by the company Vopak under the name V501.

The medium is then reflux heated for two hours.

An orange-coloured uniform medium is then obtained, which is neutralised partially (90% molar) using a soda-lime mixture in a molar ratio of 50/40.

The rate of conversion measured by HPLC under the same conditions as above is 99.0% relative to the acrylic acid.

A GPC measurement under the conditions described in the previous tests gives us a molecular mass by weight of 7725 g/mole for a polymolecularity index of 1.96.

EXAMPLE 2

This example illustrates the use of a polymer obtained according to the invention as a grinding aid agent of mineral material and more specifically calcium carbonate. This example also illustrates the process of obtaining of an aqueous suspension of calcium carbonate according to the invention.

It should also be noted that these suspensions of calcium carbonate according to the invention are refined, highly concentrated with mineral material and easily handled by the end user, i.e. easily used both for coating of paper and for mass-filling of paper.

To do so, an aqueous suspension is prepared from calcium carbonate from the Orgon deposit (France), of median diameter of around 7 micrometers.

The aqueous suspension has a dry matter concentration of 78% by weight relative to the total mass.

The grinding aid agent is introduced into this suspension according to the quantities indicated in the table below, expressed as a percentage of dry weight relative to the dry calcium carbonate mass to be ground.

The suspension circulates in a grinder of the Dyno-Mill™ type with a fixed cylinder and rotating pulser, the grinding body of which is constituted by corundum balls of diameter in the range 0.6 millimeter to 1.0 millimeter.

The total volume occupied by the grinding body is 1,150 cubic centimeters while its mass is 2,900 g.

The grinding chamber has a volume of 1,400 cubic centimeters.

The circumferential speed of the grinder is 10 meters per second.

The calcium carbonate suspension is recycled at a rate of 18 liters per hour.

The outlet of the Dyno-Mill™ is fitted with a 200 micron mesh separator enabling the suspension resulting from the grinding and the grinding body to be separated. The temperature during each grinding test is maintained at 60° C. approximately.

On completion of the grinding ($T_0$), a sample of the pigment suspension is recovered in a flask. The granulometry of this suspension (% of particles of under 1 micrometer) is measured using a Sédigraph™ 5100 granulometer from the company Micromeritics.

The Brookfield™ viscosity of the suspension is measured using a Brookfield™ viscometer type RVT, at a temperature of 20° C. and rotational speeds of 10 revolutions per minute and 100 revolutions per minute with the adequate mobile.

Test n° 4:

This test illustrates the prior art and uses 1.28% by dry weight, relative to the dry weight of calcium carbonate, of a polyacrylate, obtained by a traditional process of radical polymerisation, of molecular weight by weight equal to 5500 g/mole, of polymolecularity index equal to 2.2 and neutralised by a lime-magnesia mixture in a molar ratio equal to 50/50.

Test n° 5:

This test illustrates the invention and uses the polyacrylate in the invention of test No. 2.

All these experimental results are recorded in table 1 below, which also indicates the consumption by percentage by weight of the grinding aid agent used to obtain the indicated granulometry.

TABLE 1

| TEST N° | Dispersant used | Granu-lometry % <1 μm | % Dispers-ant | BROOKFIELD VISCOSITY (mPa·s) T = 0 | |
|---|---|---|---|---|---|
| | | | | 10 T/rpm | 100 T/rpm |
| 3 Prior art | Poly-acrylate prior art | 80 | 1.28 | 3454 | 875 |
| 4 Invention | Test N°2 | 80 | 1.22 | 2165 | 600 |

A reading of the results of table 1 shows that it is possible to use the polymers according to the invention as a grinding aid agent of mineral material in aqueous suspension, and in particular natural calcium carbonate, and that it is possible to obtain aqueous suspensions of natural calcium carbonate containing the polymer according to the invention.

This table also shows that the results obtained with the polymer according to the invention are better, in terms of consumption of the grinding aid agent and in terms of viscosity of the suspension obtained, than those obtained with a polymer, commonly used in the prior art.

These suspensions according to the invention can advantageously be used in the fields of industry such as notably the paper field, or the field of paint, and in particular in paper coating and mass-filling of paper.

EXAMPLE 3

This example illustrates the use of a polymer obtained according to the invention as a grinding aid agent of mineral material and more specifically calcium carbonate. This example also illustrates the process of obtaining of an aqueous suspension of calcium carbonate according to the invention.

In this example, the equipment and the operating conditions are identical to those used in the previous example, except for the fact that a predetermined quantity is added, namely 1.16% by dry weight, relative to the dry weight of calcium carbonate, of the grinding aid agent, and that the granulometries obtained for an equivalent dose of grinding aid agent are compared, with the grinding operation being stopped when the viscosity of the suspension no longer allows the grinding operation to be continued.

Test n° 6:

This test illustrates the prior art and uses a polyacrylate, obtained by a traditional process of radical polymerisation, of molecular weight by weight of 5500 g/mole, of polymolecularity index equal to 2.4 and totally neutralised by soda.

The calcium carbonate suspension obtained at a granulometry such that 79.2% of the particles have a diameter of under 1 micrometer, measured using the Sedigraph™ 5100.

Test n° 7:

This test illustrates the invention and uses the polyacrylate according to the invention of test No. 1.

The calcium carbonate suspension obtained at a granulometry such that 89.3% of the particles have a diameter of under 1 micrometer, measured using the Sedigraph™ 5100.

A reading of the abovementioned results shows that it is possible to use the polymers according to the invention as a grinding aid agent of mineral material in aqueous suspension, and in particular natural calcium carbonate, and that it is possible to obtain aqueous suspensions of natural calcium carbonate containing the polymer according to the invention.

In addition, these results show that the polymer according to the invention enables a finer granulometry to be attained than that obtained with a polymer commonly used in the prior art.

These suspensions according to the invention can advantageously be used in the fields of industry such as notably the paper field, or the field of paint, and in particular in paper coating and mass-filling of paper.

The invention claimed is:

1. A process for controlled radical homopolymerization, in an aqueous solution, of acrylic acid and its salts, or of copolymerization, in aqueous solution, of acrylic acid with one or more hydrosoluble monomers, wherein said process is in batch or semi-batch mode, and wherein said process comprises two stages, the first of which is synthesizing "in situ" an hydrosoluble transfer agent used in the second stage of polymerization;

wherein the reactive media of the first stage of synthesis of the transfer agent and of the second stage of polymerization are identical and solely water.

2. The process according to claim 1, wherein said process is a process of controlled radical homopolymerization, in an aqueous solution, of acrylic acid, and is undertaken in batch mode.

3. The process according to claim 1, wherein the hydrosoluble transfer agent is an α-substitute β-carboxylate xanthate salt.

4. The process according to claim 1, wherein, in the second stage of polymerization, the limits of quantity of transfer agent are determined, such that the molar ratio of transfer agent to monomer is between 0.001% and 20%, and the mass ratio of transfer agent to monomer is between 0.01% and 60%.

5. The process according to claim 1, wherein said process consists in putting in contact in the first stage:
- a potassium xanthate,
- 2-bromopropionic acid sodium salt,
- water, and then in adding, in the second stage, acrylic acid and at least one hydrosoluble initiator of free radicals.

6. The process according to claim 1, wherein the first stage is undertaken with equimolar quantities of potassium xanthate and the sodium salt of 2-bromopropionic acid.

7. The process according to claim 1, wherein the hydrosoluble copolymerized monomers are selected from the group consisting of methacrylic acid, itaconic acid, maleic acid, 2-acrylamido-2-methyl-1-propane sulphonic acid in acid form or partially neutralized, 2-methacrylamido-2-methyl-1-propane sulphonic acid in acid form or partially neutralized, 3-methacrylamido-2-hydroxy-1-propane sulphonic acid in acid form or partially neutralized, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid, as well as all their salts, vinyl sulphonic acid, sodium methallylsulfonate, sulfopropyl acrylate or methacrylate, sulfomethylacrylamide, sulfomethylmethacrylamide, acrylamide, methylacrylamide, n-methylolacrylamide, n-acryloylmorpholine, ethylene glycol methacrylate, ethylene glycol acrylate, propylene glycol methacrylate, propylene glycol acrylate, propene phosphonic acid, ethylene or propylene glycol acrylate or methacrylate phosphate, vinylpyrrolidone, methacrylamido propyl trimethyl ammonium chloride or sulphate, trimethyl ammonium ethyl chloride or sulphate methacrylate, as well as their acrylate or acrylamide counterparts, whether quaternised or not, ammonium dimethyldiallylchloride, and mixtures thereof.

* * * * *

UNITED STATES PATENT AND TRADEMARK OFFICE
CERTIFICATE OF CORRECTION

PATENT NO. : 7,462,676 B2  
APPLICATION NO. : 10/522340  
DATED : December 9, 2008  
INVENTOR(S) : Jean-Marc Suau et al.

It is certified that error appears in the above-identified patent and that said Letters Patent is hereby corrected as shown below:

Column 7, line 34, "For this test, the following is introduced into a 1 liter"  
    should read -- For this test, the following is introduced into a 1 litre --;  
    line 54, "approximately 101°C.) for seven hours."  
should read -- approximately 101°C) for seven hours. --.

Column 9, line 6, "the range 0.6 millimeter to 1.0 millimeter."  
    should read -- the range 0.6 millimetre to 1.0 millimetre. --;  
    lines 9-10, "1,400 cubic centimeters."  
should read -- 1,400 cubic centimetres. --;  
    line 11 "The circumferential speed of the grinder is 10 meters per,"  
should read -- The circumferential speed of the grinder is 10 metres per, --;  
    line 14, "18 liters per hour."  
should read -- 18 litres per hour. --;  
    lines 18-19, "each grinding test is maintained at 60°C. approximately."  
should read -- each grinding test is maintained at 60°C approximately. --;  
    line 27, "of 20°C. and rotation speeds of 10 revolutions per minute"  
should read -- of 20°C and rotation speeds of 10 revolutions per minute --;  
    line 50, "(mPa · s)"  
should read -- (mPa.s) --.

Signed and Sealed this

Thirty-first Day of March, 2009

JOHN DOLL  
*Acting Director of the United States Patent and Trademark Office*